United States Patent
Davis et al.

(10) Patent No.: US 9,881,639 B2
(45) Date of Patent: Jan. 30, 2018

(54) WITHIN-ROW WEDGE ANGLE CONTROL FOR MAGNETIC RECORDING READ-WRITE HEADS

(71) Applicant: HGST Netherlands B.V., Amsterdam (NL)

(72) Inventors: Damaris Davis, San Jose, CA (US); Glenn P. Gee, San Jose, CA (US); Darrick T. Smith, San Jose, CA (US); Hicham M. Sougrati, Elk Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/190,859

(22) Filed: Jun. 23, 2016

(65) Prior Publication Data
US 2017/0372729 A1    Dec. 28, 2017

(51) Int. Cl.
- *B24B 41/06* (2012.01)
- *G11B 5/31* (2006.01)
- *G11B 5/60* (2006.01)
- *G11B 5/127* (2006.01)

(52) U.S. Cl.
CPC .......... *G11B 5/3169* (2013.01); *G11B 5/1278* (2013.01); *G11B 5/6082* (2013.01)

(58) Field of Classification Search
CPC ............ G11B 55/3169; G11B 55/1278; G11B 55/6082; B24B 41/06; B24B 49/16; B23Q 3/104; B23Q 16/007
USPC ........................... 451/5, 380, 387, 11, 12, 13
See application file for complete search history.

(56) References Cited

U.S. PATENT DOCUMENTS

| | | | | |
|---|---|---|---|---|
| 3,170,271 A | * | 2/1965 | Unterbrink | B24B 41/06 451/278 |
| 3,423,885 A | * | 1/1969 | Crandall | B23Q 3/104 269/902 |
| 4,517,041 A | * | 5/1985 | Hennenfent | B23Q 1/03 156/155 |
| 5,203,119 A | * | 4/1993 | Cole | B24B 37/013 451/11 |

(Continued)

OTHER PUBLICATIONS

International Search Report and Written Opinion for counterpart PCT/US2017/037537, dated Sep. 11, 2017, 11 pages, EPO/ISR.

*Primary Examiner* — George Nguyen
(74) *Attorney, Agent, or Firm* — John D. Henkhaus

(57) ABSTRACT

A process for lapping a row of head sliders involves fixing the row to a lapping tool fixture, actuating each of multiple force pins to set each head slider for lapping to a respective target wedge angle, and simultaneously lapping accordingly. Each target wedge angle may be achieved by applying a respective torque to a compliant elastomer between each force pin and corresponding head slider, to transfer a pressure gradient corresponding to the torque to the corresponding head slider. Such torques may be applied through at least two wedge angle flexures interconnecting a rotatable box structure and a fixed back wall of a lapping tool, wherein the flexures virtually intersect at and define an axis of rotation about which the torques are applied. The process may further involve actuating each force pin to set each head slider for lapping to a respective reader target stripe height, and simultaneously lapping accordingly.

14 Claims, 10 Drawing Sheets

(56) References Cited

U.S. PATENT DOCUMENTS

| | | | | |
|---|---|---|---|---|
| 5,266,769 | A * | 11/1993 | Deshpande | G11B 5/6005 219/121.69 |
| 5,607,340 | A * | 3/1997 | Lackey | B24B 37/048 29/603.16 |
| 5,951,371 | A | 9/1999 | Hao | |
| 6,045,431 | A * | 4/2000 | Cheprasov | B23Q 1/34 451/5 |
| 6,093,083 | A | 7/2000 | Lackey | |
| 6,287,170 | B1 * | 9/2001 | Hao | B24B 37/048 451/1 |
| 6,346,029 | B1 * | 2/2002 | Church | B24B 37/048 451/11 |
| 6,390,905 | B1 * | 5/2002 | Korovin | B24B 37/30 451/286 |
| 6,447,367 | B1 * | 9/2002 | Kozu | B23Q 1/34 29/603.16 |
| 6,568,992 | B1 | 5/2003 | Angelo et al. | |
| 6,857,937 | B2 * | 2/2005 | Bajorek | G11B 5/10 29/603.08 |
| 6,884,148 | B1 | 4/2005 | Dovek et al. | |
| 7,438,628 | B2 * | 10/2008 | Kundig | B24B 21/08 451/10 |
| 7,634,850 | B2 | 12/2009 | Tanaka | |
| 8,254,057 | B1 | 8/2012 | Hattori et al. | |
| 8,390,962 | B2 | 3/2013 | Gunder et al. | |
| 8,614,863 | B2 | 12/2013 | Fujii et al. | |
| 2001/0055933 | A1 | 12/2001 | Shindou et al. | |
| 2002/0077044 | A1 * | 6/2002 | Shindo | B24B 37/048 451/285 |
| 2006/0168798 | A1 | 8/2006 | Naka | |
| 2007/0070543 | A1 | 3/2007 | Gunder et al. | |
| 2008/0022510 | A1 * | 1/2008 | Tanaka | G11B 5/3169 29/603.16 |
| 2008/0072418 | A1 * | 3/2008 | Kondo | G11B 5/1278 29/603.12 |

* cited by examiner

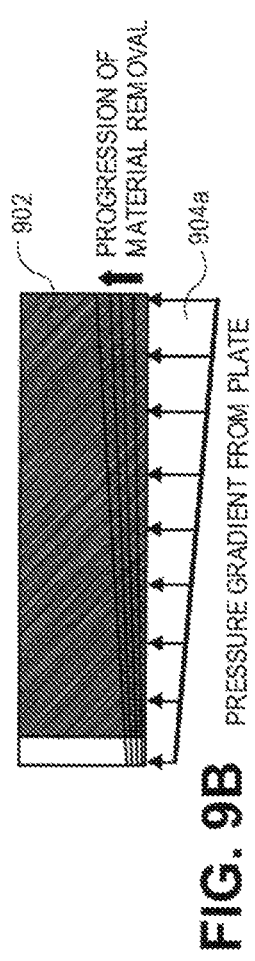
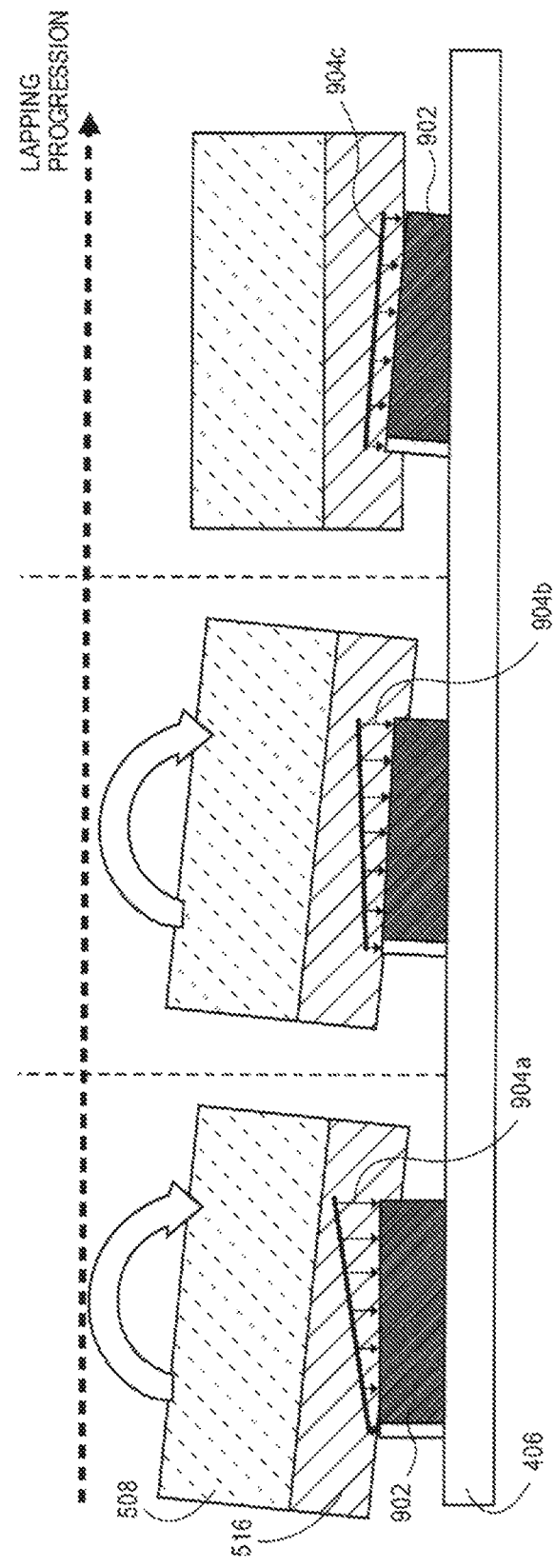
FIG. 9B
FIG. 9A

WITHIN-ROW WEDGE ANGLE CONTROL FOR MAGNETIC RECORDING READ-WRITE HEADS

FIELD OF EMBODIMENTS

Embodiments of the invention may relate generally to magnetic recording devices and more particularly to controlling the wedge angle within a row bar.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a agnetic field. Electrical pulses are sent to the write head, with different patterns of positive and negative currents. The current in the coil of the write head induces a magnetic field across the gap between the head and the magnetic disk, which in turn magnetizes a small area on the recording medium.

High volume magnetic thin film head slider fabrication involves high precision subtractive machining performed in discrete material removal steps. Slider processing starts with a completed thin film head wafer consisting of 40,000 or more devices, and is completed when all the devices are individuated and meet numerous and stringent specifications. Each individual device ultimately becomes a read-write head (e.g., Perpendicular Magnetic Recording (PMR) heads) for flying over a spinning disk.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. Precise control of the critical dimensions of a read head element and a write head element, by way of machining and lapping, are commonly practiced and are a necessity of manufacturing. Of continued importance is the alignment of the read and write portions of the head relative to each other. For optimum yield, performance and stability, precise dimensional control over both the reader and/or writer elements is desirable.

For example, process improvements regarding the magnetic core width (MCW) (as well as the magnetic erase width (MEW), magnetic write width (MWW), magnetic interference width (MIW), and other related magnetic core measures) would benefit areal density because the MCW effectively determines the width of a magnetic bit recorded by the write head. Furthermore, the single largest contributor to the overall MCW sigma is typically the "within row-bar" sigma. Even though manufacturing processes are developed to produce read-write heads having an MCW as close as possible to a desired MCW for the system, some thin-film and other manufacturing processes (e.g., lithography, etching, rough lapping, material elasticity, etc.) experience inherent variations that make it quite challenging to achieve the desired MCW for every read-write head manufactured.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed toward a process or method for lapping a row of magnetic read-write head sliders, a read-write head slider prepared according to such a process, a data storage device comprising a read-write head slider prepared according to such a process, and a lapping tool for performing such a process. The lapping process involves fixing the row (or "row-bar") of sliders to a lapping tool fixture, actuating each of a plurality of force pins to set each head slider of the row-bar for lapping to a respective target wedge angle, and simultaneously lapping each head slider according to each respective target wedge angle. Embodiments may further involve actuating each force pin to set each head slider for lapping to a respective target stripe height, and simultaneously lapping each head slider according to each respective target stripe height, after lapping to each respective wedge angle.

Embodiments may include applying a respective torque to a compliant elastomer between each force pin and a corresponding head slider, to transfer a pressure gradient corresponding to the torque to the corresponding head slider, to lap to the target wedge angle. Further, the torques may be applied through at least two wedge angle flexures interconnecting a rotatable box structure and a fixed back wall of a lapping tool, wherein the flexures virtually intersect at and define an axis of rotation about which the torques are applied.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 7A is a cross-sectional side view illustrating a fixture of the lapping tool of FIG. 7, according to an embodiment;

FIGS. 9A, 9B are diagrams illustrating a "soft" bond WA lapping process, according to an embodiment.

DETAILED DESCRIPTION

Approaches to lapping a row-bar of magnetic read-write head sliders are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of a read-write head for a digital data storage device such as a hard disk drive (HDD). Thus, in accordance with an embodiment, a plan view illustrating an HDD 100 is shown in FIG. 1 to illustrate an exemplary operating context.

Figure 1:
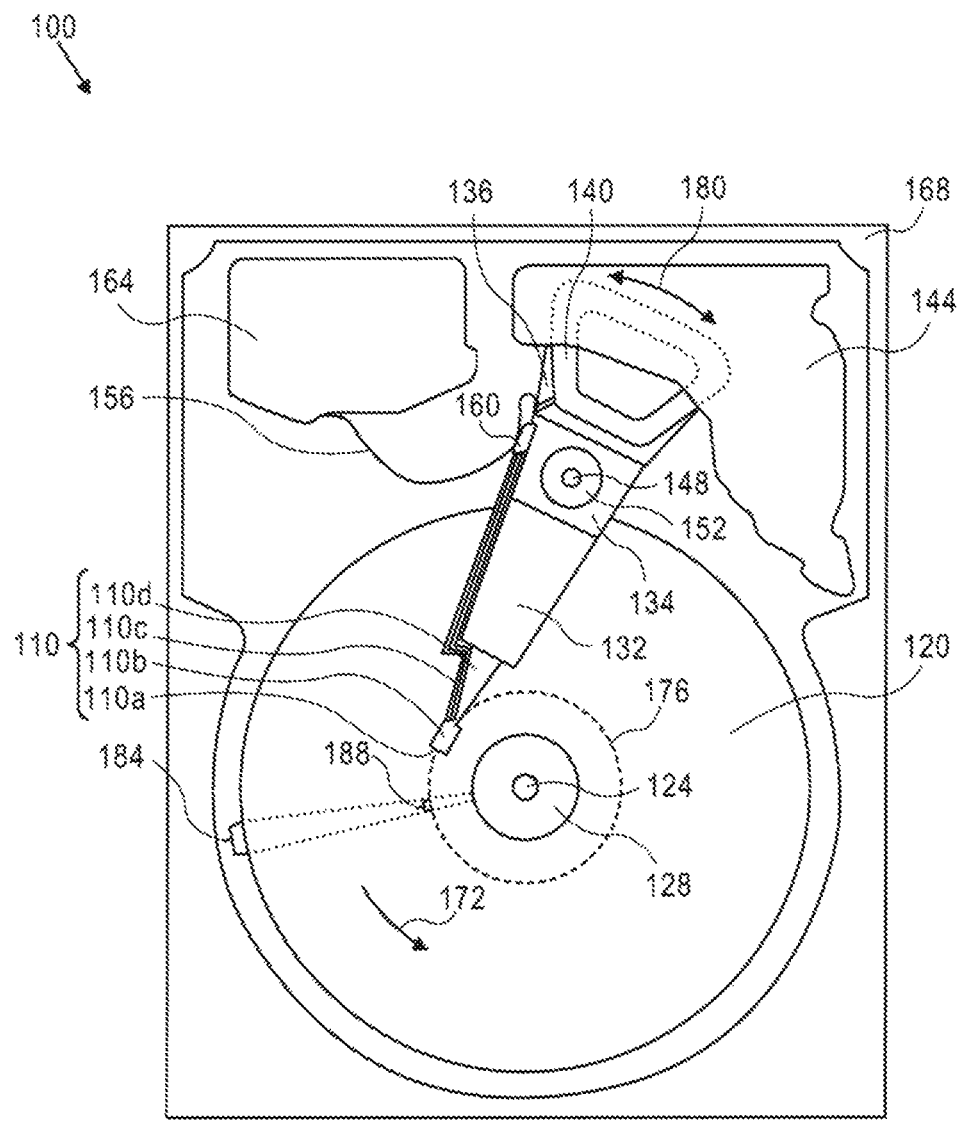
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

As mentioned, the largest contributor to the overall magnetic core width (MCW) sigma is typically the "within row-bar" sigma, and even though manufacturing processes are developed to produce read-write heads having an MCW as close as possible to a target MCW, some thin-film processes experience inherent variations that make it an ongoing challenge to achieve the target MCW for every head manufactured.

Furthermore, high-volume magnetic thin film head slider fabrication involves high precision subtractive machining performed in discrete material removal steps. Slider processing starts with a completed thin film head wafer consisting of 40,000 or more devices, and is completed when all the devices are individuated and meet numerous and stringent specifications. The individual devices ultimately become head sliders housing a read-write head. Therefore, precise control of the reader dimension and of the alignment of the reader and writer relative to each other are critical components of the read-write head fabrication process, in order to achieve optimum yield, performance, and stability. In order to achieve ideal dimensions for each individual read-write head, one might choose to process each head slider individually. However, that approach is hardly feasible from a practical manufacturability standpoint because, for example, it results in a significantly more complex, inefficient, and costly head slider fabrication process.

Figure 2:
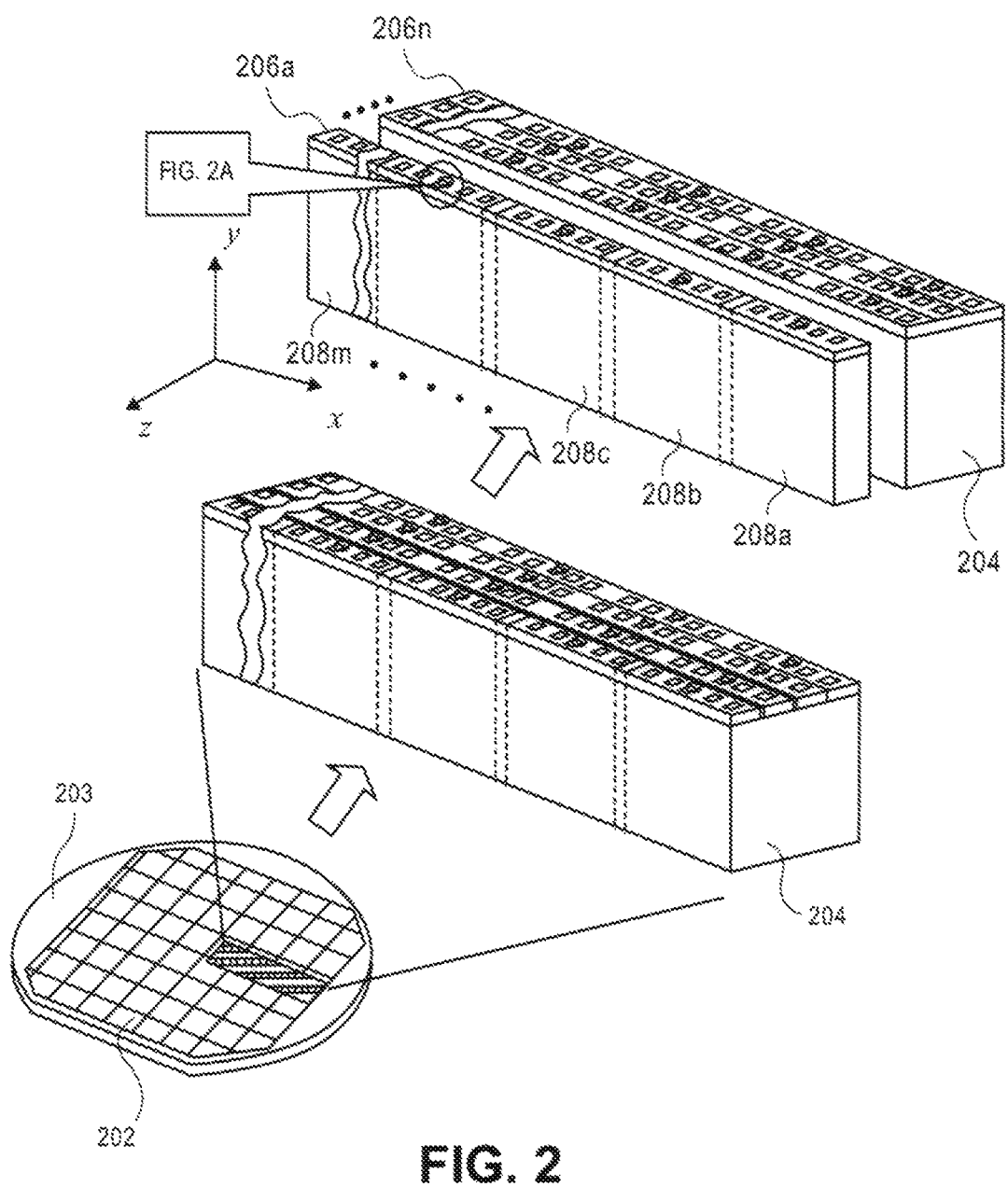
FIG. 2 is an exploded perspective view illustrating a wafer of head sliders in various stages of processing, according to an embodiment.
Figure 2A:
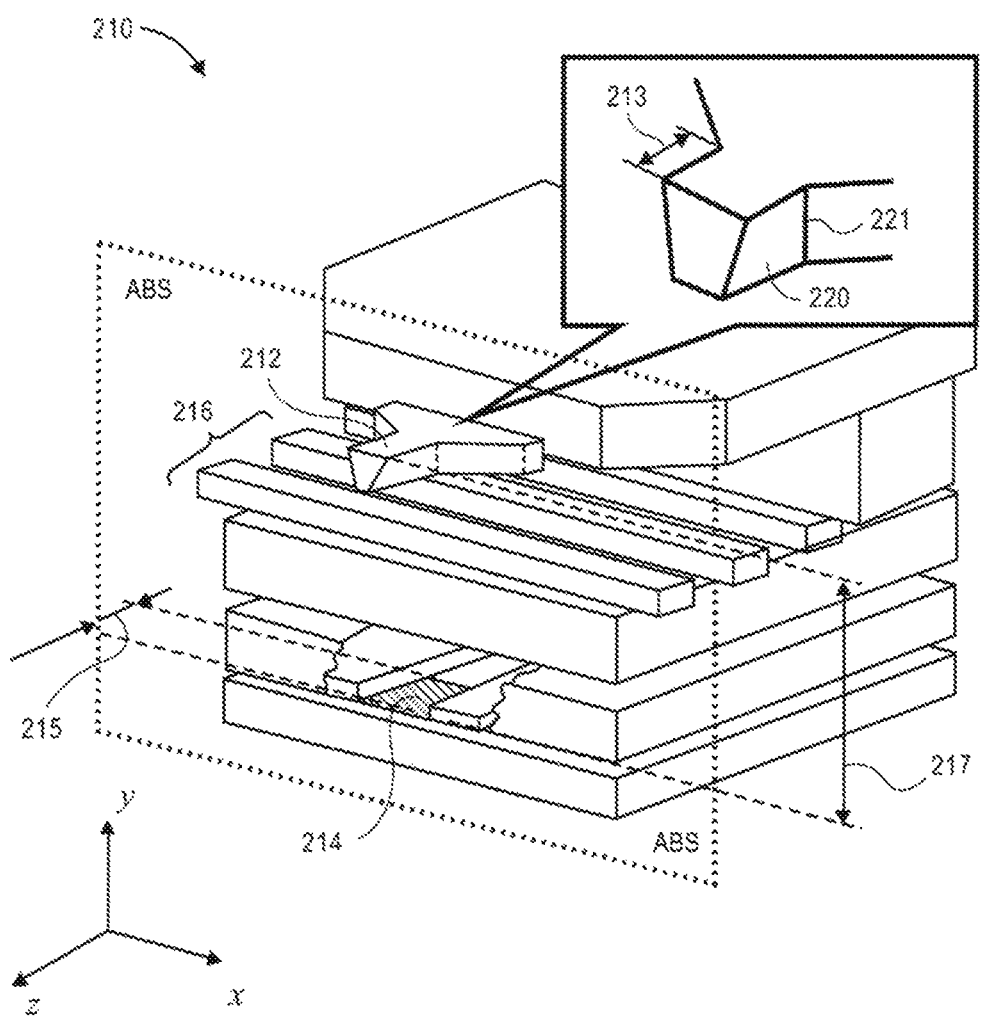
FIG. 2A is a perspective view illustrating a read-write transducer, according to an embodiment.

FIG. 2 is an exploded perspective view illustrating a wafer of head sliders in various stages of processing, and FIG. 2A is a perspective view illustrating a read-write transducer, both according to an embodiment. FIG. 2 depicts a wafer 202, comprising a matrix of unfinished head sliders having unfinished read-write transducers (see, e.g., FIG. 2A) deposited on a substrate 203, for which AlTiC is commonly used. The matrix of sliders is typically processed in batches, i.e., subsets of the wafer, historically referred to as "quads" and now at times referred to as "chunks" or "blocks". A block of unfinished head sliders, block 204, comprises multiple rows 206a-206n (or "row-bars") of unfinished head sliders, where n represents a number of row-bars per block 204 that may vary from implementation to implementation. Each row 206a-206n comprises multiple head sliders 208a-208m, where m represents a number of head sliders per row 206a-206n that may vary from implementation to implementation.

With reference to FIG. 2A, read-write transducer 210 comprises a writer element 212 (or simply "writer 212") and a corresponding coil 216. Write heads make use of the electricity flowing through a coil such as coil 216 to produce a magnetic field. Electrical pulses are sent to the write head, with different patterns of positive and negative currents, where the current in the coil of the write head induces a magnetic field across the gap between the head and the magnetic disk, which in turn magnetizes a small area on the recording medium. A writer such as writer 212 has a corresponding flare point 213, which is the distance between (a) the end of the main pole (i.e., the end of the pole tip 220) of the writer and (b) the point 221 at which the pole tip 220 flares down to its smallest cross-section. The flare point 213 is commonly considered a critical dimension associated with a magnetic writer such as writer 212.

Continuing with FIG. 2A, read-write transducer 210 further comprises a reader element 214 (or simply "reader 214") having a corresponding stripe height 215, which is also considered a critical dimension associated with a magnetic reader such as reader 214. The flare point 213 of the writer 212 and the stripe height 215 of the reader 214 are commonly controlled in fabrication by, but not limited to, a "rough lap" process referred to as wedge angle lapping ("WAL"), which is described in more detail herein (such as in reference to FIG. 3).

Read-write transducers such as transducer 210 are further associated with a reader-writer offset 217 (or "read-write offset", or "RWO"), which is the distance between a certain point or surface of the reader 214 and a certain point or surface of the writer 212, in what is depicted as the y-direction. The RWO 217 is designed into the read-write transducer 210. However, uncontrollable (and undesirable) offsets between the writer 212 and the reader 214 may occur during wafer 202 fabrication, which may cause a linear and/or angular offset that may vary along a row in what is depicted as the x-direction. Any such offset is largely due to the fact that the writer 212 and the reader 214 are deposited in different thin-film layers and, therefore, is due to manufacturing process limitations. For example, the writer 212 and the reader 214 may not always line up precisely relative to the air bearing surface and/or relative to each other because of the challenges associated with exposing different masks having different patterns at different deposition layers, in nanometer-scale manufacturing processes.

Consequently, the RWO fabricated at the wafer level may not be precisely the target RWO. Hence, the aforementioned WAL (or "RWO angle") process is typically employed to align a row-bar RWO more closely to the target RWO. However, the aforementioned rough lapping WAL process can typically only reach a level of correction around 5 nm, and is typically applied "per row-bar" rather than "per slider". Thus, a finer, more precise lapping procedure could be considered useful.

Head Slider Fabrication Processes-Generally

A typical head slider fabrication process flow may include the following: a wafer (e.g., wafer 202 of FIG. 2) fabrication process, which includes deposition of the reader and writer elements (e.g., reader 214 and writer 212 of FIG. 2A), followed by block (or "quad") slicing to remove a block (e.g., block 204 of FIG. 2) of unfinished sliders from the wafer. An outer row (e.g., row 206a of FIG. 2) of sliders (e.g., head sliders 208a-208m of FIG. 2) from the block may then be rough lapped (e.g., wedge angle lapped) in order to fabricate close to the desired reader and writer dimensions (e.g., flare point 213 and stripe height 215 of FIG. 2A), and then the outer rough-lapped row (e.g., row 206a) sliced from the block (e.g., block 204). From there, the row may be further lapped, such as "back-lapped" to form the flexure-side surface opposing the air bearing surface (ABS), and "fine-lapped" (or "final lapped") to further refine the ABS surface. This then may lead to overcoating, and rail etching, etc. of the ABS surface to form the final air bearing or flying surface, at which point each head slider (e.g., head sliders 208a-208m) may be diced or parted from the row to individuate each finished head slider, whereby it can then be coupled with a flexure, assembled into a head-gimbal assembly (HGA), and so on.

Wedge Angle Lapping

As discussed, the flare point 213 (FIG. 2A) of the writer 212 (FIG. 2A) and the stripe height 215 (FIG. 2A) of the reader 214 (FIG. 2A) are commonly controlled in fabrication by, but not limited to, a rough lapping process referred to as wedge angle lapping ("WAL"). With "passive WAL control", a row-bar is lapped to a predetermined wedge angle ("WA"), often based upon off-line electrical test measurements, whereby the WA is controlled by lapping to a physical target angle. Alternatively, with "active WAL control", the row-bar is servoed or controlled to a desired RWO, based on resistance-based feedback (e.g., from use of electronic lapping guides, or "ELGs", associated with the reader and/or writer elements). In both cases, an average or median WA is targeted for the entire row-bar, without individual control of the head sliders within the row-bar.

Figure 3:
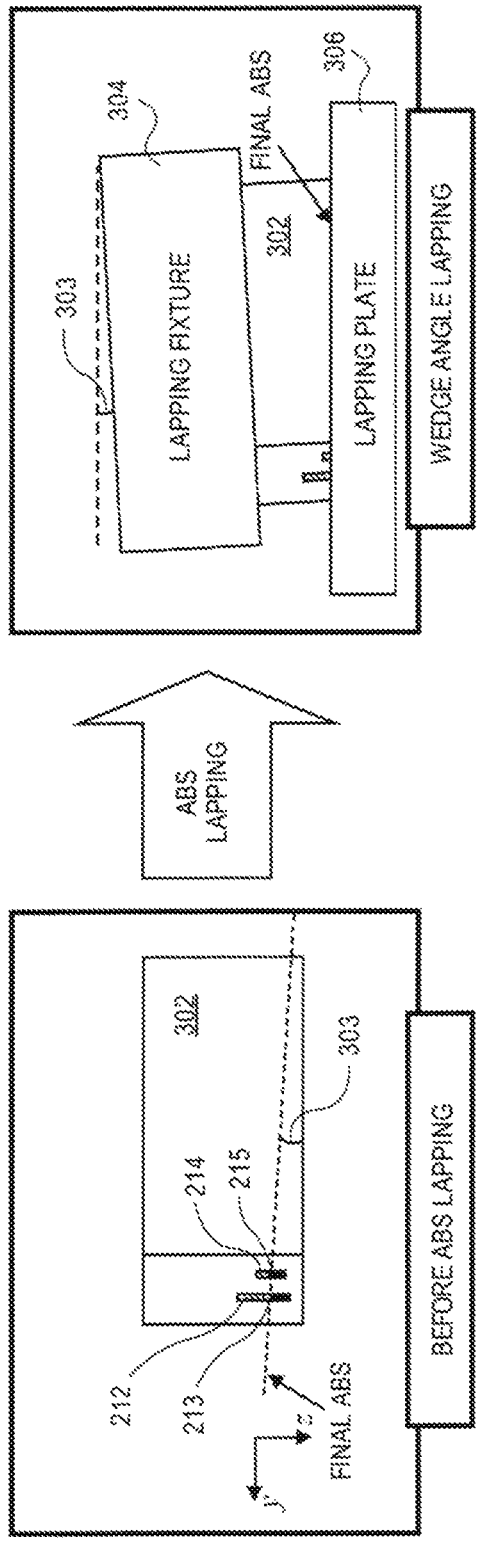
FIG. 3 is a diagram illustrating a wedge angle lapping (WAL) process.

FIG. 3 is a diagram illustrating a wedge angle lapping (WAL) process, such as at a rough lap stage. The left-hand diagram of FIG. 3 depicts a head slider 302 before air bearing surface ("ABS") rough lapping. The reader 214 and corresponding desired stripe height 215 are depicted, the lapping of which as previously mentioned is typically controlled via a resistance-based feedback mechanism, and the writer 212 and corresponding resultant flare point 213 are also depicted. A dashed line illustrates the desired final ABS, which is achieved by lapping the ABS side of the head slider 302 at a wedge angle 303.

Thus, with reference to the right-hand side diagram of FIG. 3, ABS lapping may be performed on head slider 302 using a lapping fixture 304 and a lapping plate 306 (e.g., commonly diamond-encrusted and/or accompanied by a diamond slurry), depicted in simplified form. The fixture 304 is set such that the lapping plate 306 operates to lap the head slider 302 at a wedge angle 303 until target reader 214 and writer 212 dimensions are ultimately reached, thereby achieving read-write head having at least the desired stripe height 215 for this particular portion of the head slider fabrication process.

Wedge angle lapping is typically performed at a certain predetermined wedge angle on an entire row-bar of sliders, such as any of row 206a-206n (FIG. 2). Thus, each of the sliders 208a-208m (FIG. 2) within a given row is rough lapped at the same wedge angle, such as wedge angle 303 (FIG. 3). However, as previously mentioned, an undesirable offset(s) between the writer 212 (FIG. 2A) and the reader 214 (FIG. 2A) may occur during wafer 202 (FIG. 2) fabrication, which may cause a linear and/or angular offset in one or more directions. Furthermore, such an offset(s) corresponding to the writer 212 and the reader 214 may not be constant along the length (x-direction) of any given row (e.g., row 206a) of head sliders, nor across multiple rows (e.g., 206a-206n) from a block (e.g., block 204 of FIG. 2). Again, therein lies a reason that processing of head sliders individually, if practical feasible, may be considered desirable.

Figure 4:
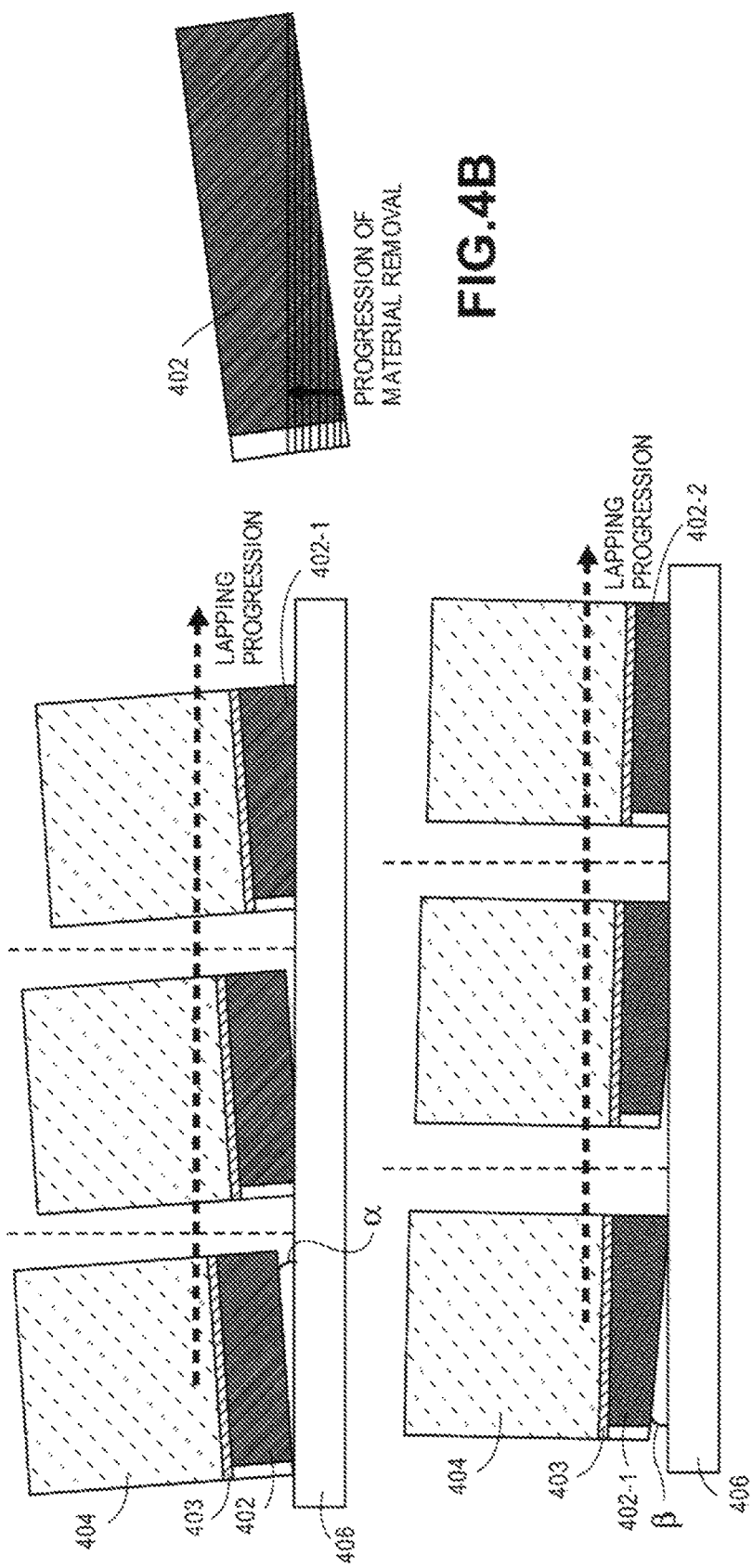
FIGS. 4A, 4B are diagrams illustrating a rigid bond WA lapping process.

FIGS. 4A, 4B are diagrams illustrating a rigid bond WA lapping process, which may be applicable to a scenario as depicted in FIG. 3. FIG. 4A depicts a series of "snapshots" (with each snapshot separated by a vertical dashed line) of a rough lap WAL process, in which an unfinished head slider 402 is temporarily bonded to a rigid tooling fixture 404 using a rigid adhesive bond 403. In the top portion of FIG. 4A, it is appreciated that the head slider 402 is progressively lapped at a first wedge angle $\alpha$, using a lapping plate 406, thus fabricating a head slider 402-1 depicted as having a first quadrilateral polygon shape. Lapping at the wedge angle $\alpha$ may be with the purpose of achieving a particular target stripe height for the reader (such as stripe height 215 for reader 214 of FIG. 2A). With reference to FIG. 4B, it is appreciated that at the constant wedge angle $\alpha$, the progression of head slider 402 material removal is uniform (i.e., at a constant angle) as lapping progresses through the WAL process to reach head slider 402-1.

In the bottom portion of FIGS. 4A, 4BA, it is appreciated that the head slider 402-1 is progressively lapped at a second wedge angle $\beta$, continuing to use the lapping plate 406, thus fabricating a head slider 402-2 depicted as having a second quadrilateral polygon shape. This lapping to the constant wedge angle $\beta$ is similarly uniform as lapping progresses through the WAL process to reach head slider 402-2. It is noteworthy that, in current practice, adjustment of the wedge angle can typically only be made one or two times during the rough lap WAL process depicted in FIGS. 4A, 4B. Furthermore, use of constant wedge angles, even if adjusted once or twice, may produces a facet(s) in the head slider (best depicted in head slider 402-1). Still further, it is noteworthy that this rough lap WAL process is commonly employed by targeting a reader element stripe height (such as stripe height 215 for reader 214 of FIG. 3), and obtaining lapping feedback via a reader or writer ELG, while the writer element flare point (such as flare point 213 for writer 212 of FIG. 3) and the RWO 217 (FIG. 2) are relatively uncontrolled.

Lapping Tool for within-Row Wedge Angle Lapping

Figure 5:
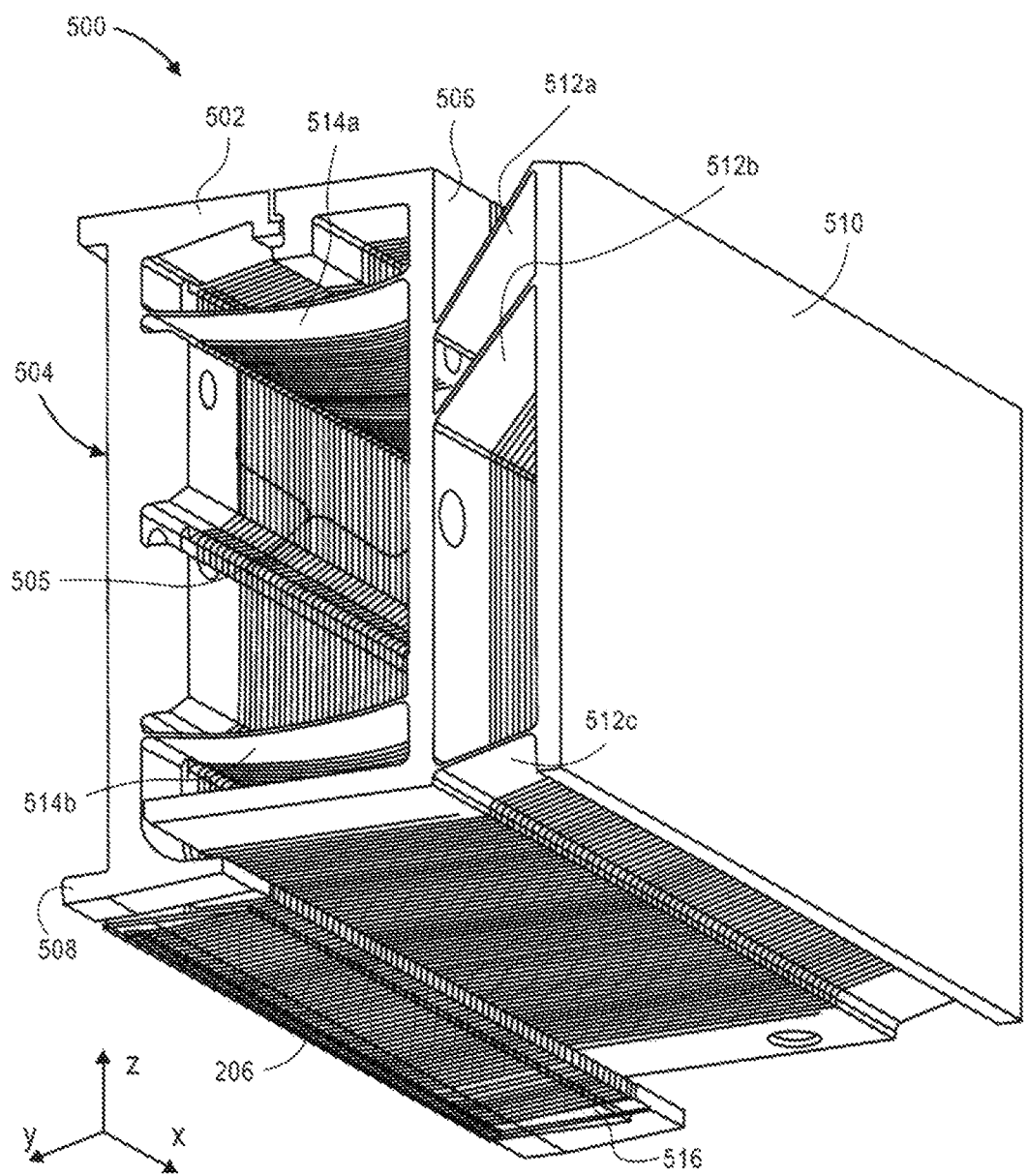
FIG. 5 is a bottom side perspective view illustrating a lapping tool, according to an embodiment.
Figure 6:
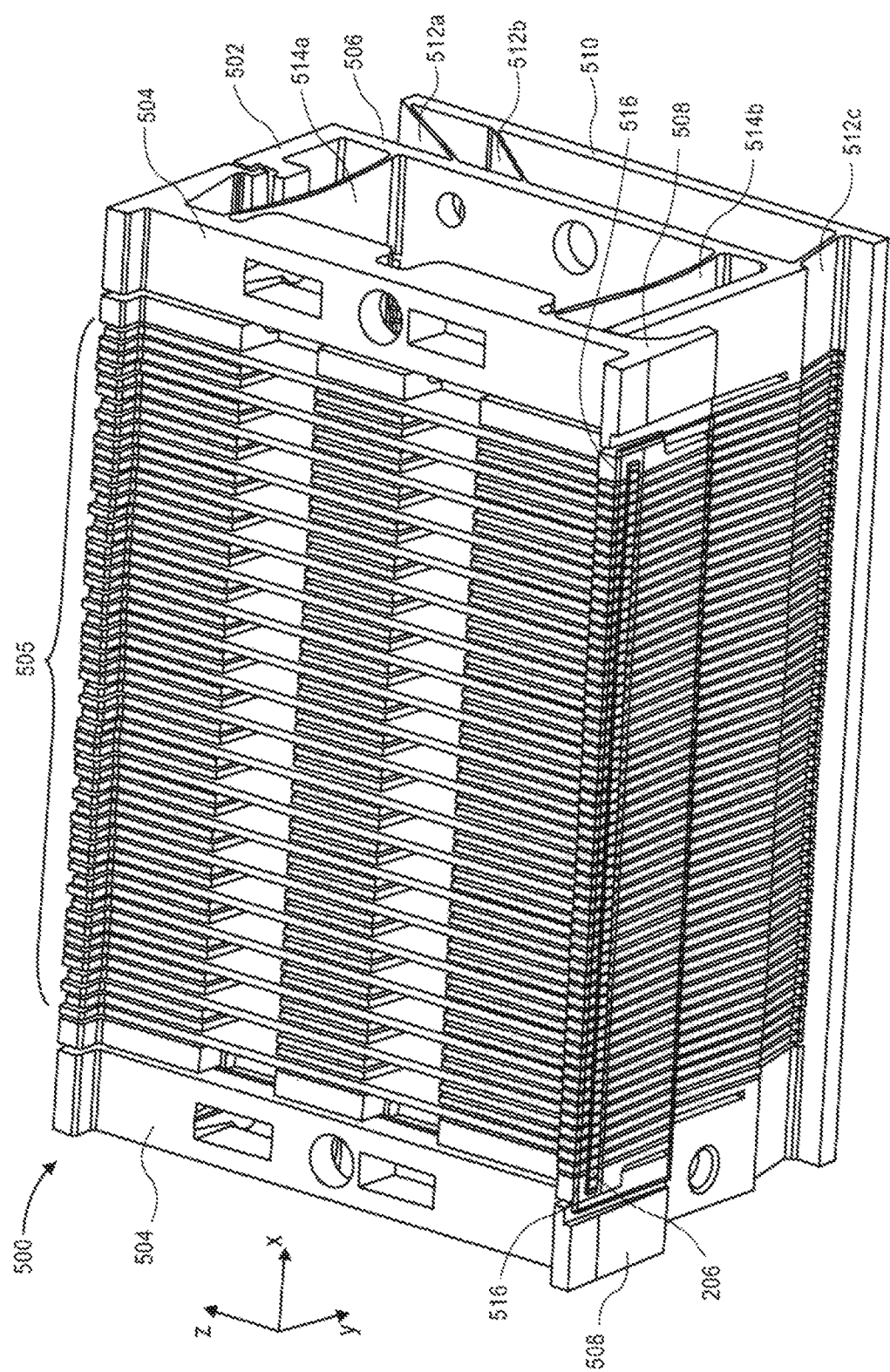
FIG. 6 is a bottom front perspective view illustrating the lapping tool of FIG. 5, according to an embodiment.

FIG. 5 is a bottom side perspective view illustrating a lapping tool, and FIG. 6 is a bottom front perspective view illustrating the lapping tool of FIG. 5, both according to embodiments. Lapping tool 500 comprises a box structure 502 that, according to an embodiment, is rotatable and/or flexible. The box structure 502 includes a front side 504 housing a plurality of force pins 505 that are generally translatable in a z-direction, and a back wall 506.

The lapping tool 500 further comprises a fixture 508 for holding a row-bar 206 of magnetic read-write head sliders, such that each of the plurality of force pins 505 is positioned to apply a force to a corresponding head slider of the row-bar 206. The lapping tool 500 further comprises a second back wall 510 a distance from the back wall 506 of the box structure 502, and at least two flexible wedge angle (WA) flexures 512a, 512b (three depicted, along with WA flexure 512c) interconnecting the back wall 506 of the box structure 502 and the second back wall 510. Notably, the WA flexures 512a, 512b, 512c "virtually" intersect at, and therefore define, an axis of rotation about an x-axis associated with the row-bar 206 (depicted and described in more detail in reference to FIGS. 7, 7A). Hence, in response to actuation, and based on the virtual intersection of the WA flexures 512a, 512b, 512c, each force pin 505 applies a torque to its corresponding head slider about the axis of rotation defined by the virtual intersection of the WA flexures 512a, 512b, 512c.

Based on the foregoing interacting structures of lapping tool 500, an independent and variable wedge angle (relative to the y-axis) can be set for each head slider (e.g., head slider 208a-208m of FIG. 2) of the row bar 206, for lapping to a respective target wedge angle. In effect, the plurality of force pins 505, in response to actuation, collectively twists the row-bar 206 to concurrently set each head slider of the row-bar 206 for concurrent lapping to its respective target wedge angle.

According to an embodiment, the lapping tool 500 further comprises a compliant elastomer 516 between each force pin 505 and its corresponding head slider (e.g., head slider 208a-208m of FIG. 2) of the row bar 206, to transfer a y-direction pressure gradient (e.g., pressure gradient 904a of FIG. 9A) corresponding to the torque from the force pin 505 to the corresponding head slider 208a-208m. As such, the material removal associated with each head slider 208a-208m due to lapping corresponds to the pressure gradient 904a applied to each respective head slider 208a-208m.

According to an embodiment, the material of elastomer 516 has a Shore A hardness in a range of 10-90 durometer, which is found suitable for its intended purpose. For example, use of a compliant elastomer 516 (rather than a rigid bond such as rigid adhesive bond 403 of FIG. 4A), for non-limiting examples, a silicon or polyurethane rubber (e.g., 0.05-1.5 mm thick, a range found suitable for its intended purpose), effectively eliminates the action of the head slider lifting off the lapping plate and associated faceting of the head slider which may occur with the rigid bond of FIG. 4A. Furthermore, the thicker the elastomer 516, the softer the cushion it provides between the force pins 505 and the head sliders 208a-208m (FIG. 2) and, therefore, finer control of the pressure gradient 904a across each head slider 208a-208m is achieved. That is, the response corresponding to actuation of the force pins 505 and their effect on the head sliders 208a-208m is effectively dampened. Likewise, the harder the elastomer 516, the more rapid the response corresponding to actuation of the force pins 505 and their effect on the head sliders 208a-208m (i.e., the response is less dampened and finer actuation control for more gradual change should be provided). Thus, the effective resolution of the pressure gradient 904a across each head slider can vary from implementation to implementation, based on the choice of material used for the compliant elastomer 516.

The lapping tool 500 further comprises at least two flexible stripe height (SH) flexures 514a, 514b interconnecting the front side 504 and the back wall 506 of the box structure 502. In view of the structural support provided by the SH flexures 514a, 514b to the overall box structure 502, each force pin 505 can apply a z-directional force to its corresponding head slider (e.g., head slider 208a-208m of FIG. 2) of the row bar 206, for lapping to a respective reader target stripe height (such as stripe height 215 for reader 214 of FIG. 2A). Thus, based on the foregoing interacting structures of lapping tool 500, an independent reader target stripe height (relative to the z-axis) can be set for each head slider of the row bar 206, for lapping to its respective target stripe height.

Lapping Tool Wedge Angle Flexures

Figure 7:
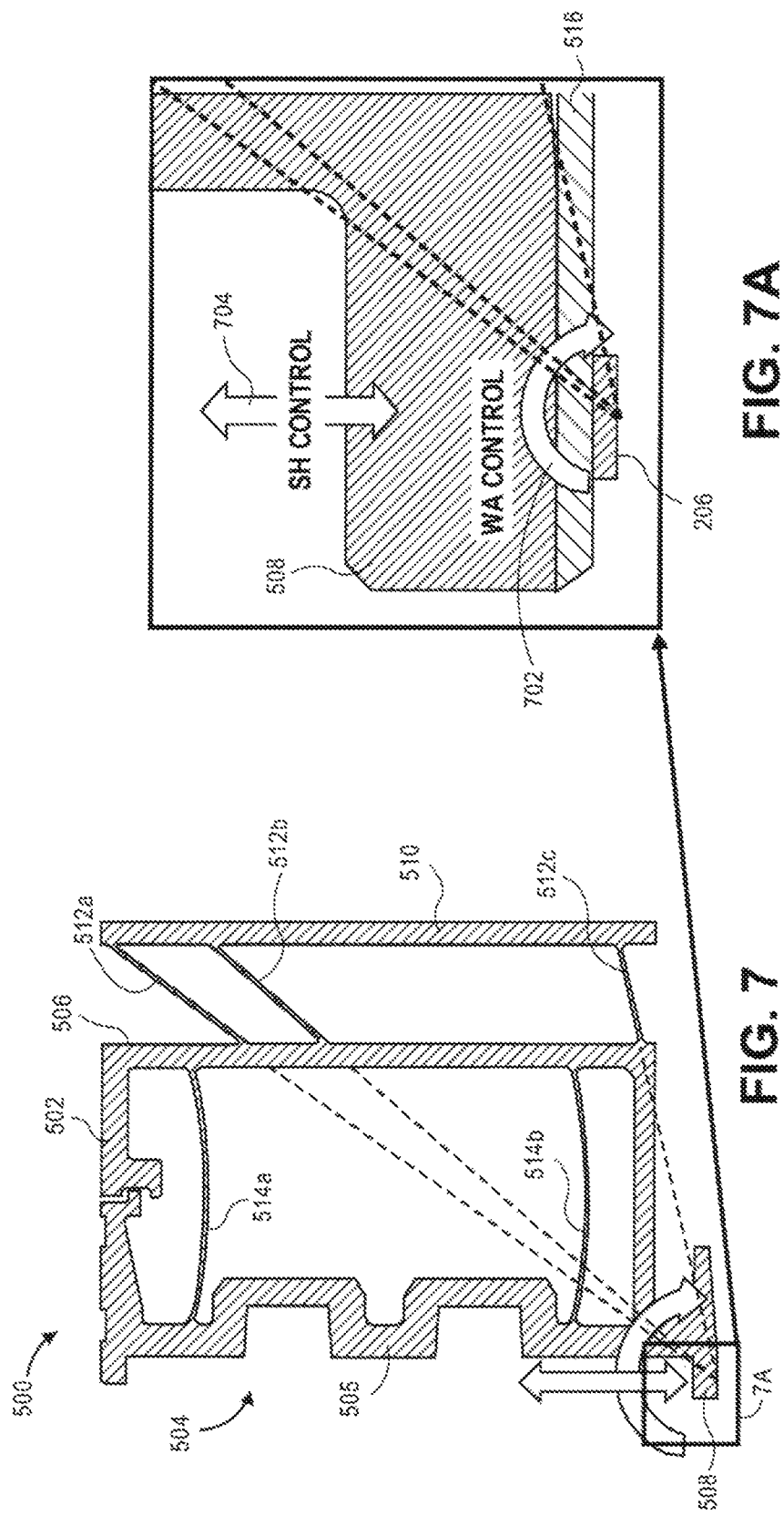
FIG. 7 is a cross-sectional side view illustrating the lapping tool of FIGS. 5-6, according to an embodiment.

FIG. 7 is a cross-sectional side view illustrating the lapping tool of FIGS. 5-6, and FIG. 7A is a cross-sectional side view illustrating a fixture of the lapping tool of FIG. 7, both according to embodiments. FIGS. 7 and 7A are referenced to describe in more detail the WA flexures 512a, 512b, 512c (FIGS. 5-6).

FIG. 7 illustrates the lapping tool 500 and constituent components, according to embodiments described in reference to FIGS. 5-6. FIGS. 7 and 7A further illustrate that the at least two wedge angle (WA) flexures 512a, 512b (and optional 512c), which interconnect the back wall 506 of the box structure 502 and the second back wall 510, are positioned and configured such that the WA flexures 512a, 512b (and 512c) "virtually" intersect at, and therefore define, an axis of rotation about an x-axis associated with the row-bar 206. Stated otherwise, the WA flexures 512a, 512b (and 512c) are positioned such that if they were to extend through and beyond the back wall 506 and the front side 504 of box structure 502, they would all intersect at a point that defines an axis of rotation (in the x-direction). It is this axis of rotation about which a torque is applied to a head slider (e.g., 208a-208m of FIG. 2) by way of actuating a corresponding force pin 505, and thus about which the box structure 502 effectively rotates. Recall that the torque, when transferred through the compliant elastomer 516, manifests as a pressure gradient 904a applied across the length (y-direction) of the corresponding head slider. Hence, it is this independently and variably applied pressure gradient 904a that provides the WA lapping control (depicted as block arrow 702) about the common axis of rotation for each respective head slider. Because the axis of rotation is, according to an embodiment, designed to be at or near the centroid of and at the lapping interface/bottom face of the row-bar 206, precise, independent and dynamically variable (i.e., by varying the actuation of force pins 505) wedge angle control is provided for each head slider constituent to row-bar 206.

Figure 8:
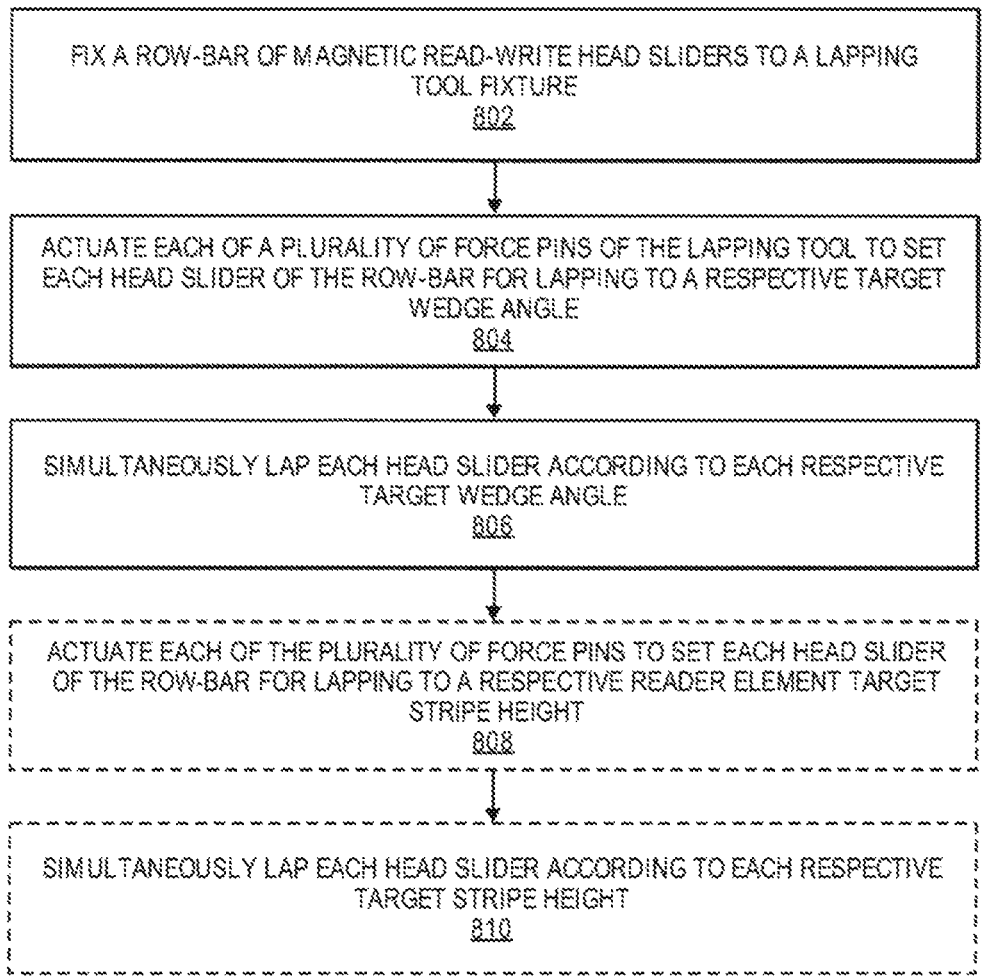
FIG. 8 is a flow diagram illustrating a method for lapping a row-bar of head sliders, according to an embodiment.

FIGS. 7 and 7A further illustrate a stripe height (SH) lapping control (depicted as block arrow 704), a use of which is described in reference to a method of lapping a row-bar in FIG. 8.

Method for Lapping a Row-Bar of Magnetic Read-Write Head Sliders

FIG. 8 is a flow diagram illustrating a method for lapping a row-bar of head sliders, according to an embodiment. The various embodiments described in reference to FIG. 8 may each be performed using the lapping tool 500 (FIGS. 5-7) described elsewhere herein. For context and as described, each row-bar has an x-axis along the direction of the row and a y-axis along the direction of a reader-writer offset associated with the head sliders in the row-bar, and each head slider comprises a reader element and a writer element.

At block 802, a row-bar of magnetic read-write head sliders is fixed to a lapping tool fixture. For example, row-bar 206 (FIGS. 5, 6, 7A) is affixed to fixture 508 (FIGS. 5-7A) of lapping tool 500 (FIGS. 5-7), such as via the elastomer 516 (FIGS. 5, 6, 7A). The tackiness of the elastomer 516 material has an effect on the capability of the elastomer 516 to hold the row-bar 206 in place on the fixture 508. Therefore, the tackiness of the elastomer 516 may vary from implementation to implementation.

At block 804, each of a plurality of force pins of the lapping tool is actuated to set each head slider of the row-bar for lapping to a respective target wedge angle. For example, each force pin 505 is actuated (for non-limiting examples, pneumatically, hydraulically, mechanically, electrically, and the like) to set each head slider 208a-208m (FIG. 2) of the row-bar 206 to a respective target wedge angle 303 (FIG. 3), which is an angle relative to the y-axis. The manner in which each respective target wedge angle is set is consistent with as described herein in reference to FIGS. 5-7A.

Thus, at block 806, each head slider is simultaneously lapped according to each respective corresponding target wedge angle. For example, each head slider 208a-208m of the row-bar 206 is lapped according to each corresponding target wedge angle 303. Recall from FIG. 3 that lapping may be performed on a head slider or a row-bar of head sliders using a lapping fixture 304 and a lapping plate 306, which is commonly diamond-encrusted and/or accompanied by a diamond slurry.

FIGS. 9A, 9B are diagrams illustrating a "soft" bond WA lapping process, according to an embodiment. Reference is further made to FIGS. 4A, 4B for a comparison of the soft bond WA lapping process of FIGS. 9A, 9B with the rigid bond WA lapping process of FIGS. 4A, 4B. FIG. 9A depicts a series of "snapshots" (with each snapshot separated by a vertical dashed line) of a "fine lap" (or "final lap") WAL process, in which an unfinished head slider 902 is temporarily bonded to a rigid tooling fixture 508 by way of a compliant elastomer 516. At the first snapshot, it is appreciated that a proper pressure gradient 904a for application to the head slider 902 to at least begin to achieve the target wedge angle is determined. For slider 902, a corresponding force pin 505 (FIGS. 5-6) is actuated to apply a torque to the lapping tool fixture 508 and through the elastomer 516 to the head slider 902 to generate the desired pressure gradient 904a across the length of the head slider 902. Note that the diagram of FIG. 9A is simplified in that the elastomer 516 appears with sharp lines at its interface with the head slider 902, e.g., as if a portion of elastomer 516 is cut away. However, appreciate that the elastomer 516 will compress (rather than cut out) in response to the torque, whereby the torque will cause greater compression within the elastomer 516 relative to the distance away from the axis of rotation (or center of torque) in the direction of the torque. Likewise, the torque will cause lesser compression within the elastomer 516 relative to the distance away from the axis of rotation (or center of torque) in the direction opposing the direction of the torque. Hence, pressure gradient 904a is depicted as smaller to larger in the direction from the left to the right. Consequently, with progressively larger point pressures applied to the head slider 902 across its length (due to the pressure gradient 904a), and in view of the head slider interfacing with a rigid lapping plate 406, more material is removed from the slider according to the pressure gradient 904a (i.e., from the left to the right).

With reference to FIG. 9B, it is appreciated that with application of pressure gradient 904a to the head slider 902, the progression of head slider 902 material removal is not at a constant angle as lapping progresses through the WAL process. Because there is some pressure across the entire length of the slider, albeit varying pressure according to the pressure gradient 904a, the progression of material removal is different from that with a rigid bond and constant lapping angle, as depicted in FIG. 4B. With application of the pressure gradient 904a, the lapping angle changes as material is progressively removed from the face of head slider 902, as depicted in FIG. 9B.

At the second (middle) snapshot, it is depicted that a slightly different pressure gradient 904b is applied to the head slider 902 to continue to achieve the target wedge angle, such as by way of a servo control change as the target wedge angle is approached. Hence, a lapping system and method as described herein provides for dynamically changing the wedge angle, per head slider, with a controlled feedback system (e.g., an ELG feedback system). The wedge angle may be dynamically changed by changing the force pin 505 actuation profile during the lapping process, whereby the lapping system is dynamically servoed to achieve a desired result. It is noteworthy that the use of progressively changing wedge angles due to the application of a pressure gradient using an elastomer, rather than the use of a constant rigid wedge angle, is much less likely to produce a facet(s) in the head slider.

Returning to the flow diagram of FIG. 8, at optional block 808, each of the plurality of force pins is actuated to set each head slider of the row-bar for lapping to a respective reader target stripe height. For example, each force pin 505 is servo or discretely actuated (for non-limiting examples, pneumatically, hydraulically, mechanically, electrically, and the like) to set each head slider 208a-208m (FIG. 2) of the row-bar 206 to a respective reader target stripe height 215 (FIGS. 2A, 3).

Continuing, at optional block 810, each head slider is simultaneously lapped according to each respective corresponding target stripe height. For example, each head slider 208a-208m of the row-bar 206 is lapped according to each corresponding reader 214 target stripe height 215 (which may be based on a reader ELG and/or writer ELG stripe height). Returning to FIG. 9A, at the third snapshot it is depicted that the torque and resultant pressure gradient(s) 904a (and 904b) across the head slider is discontinued (e.g., the target wedge angle has been reached), and a relatively (or "substantially") constant pressure 904c across the length of head slider 902 is now applied, to now lap to the target reader 214 stripe height 215.

Thus, according to an embodiment and as described elsewhere herein, in contrast with the rigid bond (rough) lapping process depicted in FIGS. 4A, 4B, this soft (fine) lap WAL process first laps to a target wedge angle and then laps to a target reader or writer stripe height, thereby providing multiple degrees of control, including control of the RWO (such as RWO 217 of FIG. 2). Compensating the process to first lap toward the target stripe height and then lap to the target wedge angle is also contemplated and within the scope of embodiments described herein.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for lapping a row-bar of magnetic read-write head sliders wherein each head slider comprises a reader element and a writer element, wherein said row-bar has an x-axis along the direction of the row and a y-axis along the direction of a reader-writer offset associated with said head sliders in said row-bar, the method comprising:
    fixing said row-bar to a lapping tool fixture;
    actuating each of a plurality of force pins of said lapping tool to set each said head slider of said row-bar for lapping to a respective target wedge angle, wherein each said wedge angle corresponds to an angle relative to the y-axis; and
    simultaneously lapping each said head slider according to each said respective target wedge angle.

2. The method of claim 1, further comprising:
    actuating each of said plurality of force pins to set each said head slider of said row-bar for lapping to a respective reader element target stripe height; and
    simultaneously lapping each said head slider according to each said respective target stripe height.

3. The method of claim 2, wherein said actuating for lapping to said stripe heights is performed after lapping each said head slider according to each said respective target wedge angle.

4. The method of claim 1, wherein said actuating for lapping to said wedge angles includes applying a respective torque to a compliant elastomer between each said force pin and a corresponding said head slider, to transfer a y-direction pressure gradient corresponding to said respective torque to said corresponding head slider.

5. The method of claim 4, wherein said actuating for lapping to said wedge angles includes changing, during said lapping to said wedge angles, at least one said torque, to dynamically change said y-direction pressure gradient corresponding to said at least one torque.

6. The method of claim 4, wherein applying said torques includes applying through at least two wedge angle (WA) flexures interconnecting a back wall of a box structure and a fixed back wall of said lapping tool, wherein said WA flexures virtually intersect at and define an x-axis of rotation about which said torques are applied.

7. The method of claim 6, further comprising:
    wherein said x-axis of rotation is located, in a z-direction, substantially at a bottom face of said row-bar, at which said row-bar is lapped.

8. The method of claim 6, further comprising:
    wherein said x-axis of rotation is located, in a y-direction, substantially at a centroid of said row-bar.

9. A lapping tool comprising:
    a box structure, said box structure including a front side housing a plurality of force pins that translate in a z-direction and a back wall;
    a fixture for holding a row-bar of magnetic read-write head sliders such that each of said plurality of force pins is positioned to apply a force to a corresponding head slider of said row-bar;
    a second back wall a distance from said back wall of said box structure; and
    at least two flexible wedge angle (WA) flexures interconnecting said back wall of said box structure and said second back wall, such that said WA flexures virtually intersect at and define an axis of rotation about an x-axis associated with said row-bar;
    wherein each said force pin, in response to actuation and based on said virtual intersection of said WA flexures, applies a torque to said corresponding head slider about said axis of rotation.

10. The lapping tool of claim 9, further comprising:
    a compliant elastomer between each said force pin and said corresponding head slider to transfer a y-direction pressure gradient corresponding to said torque from said force pin to said head slider.

11. The lapping tool of claim 10, wherein said elastomer has a material Shore A hardness in a range of 10-90 durometer.

12. The lapping tool of claim 9, further comprising:
    at least two flexible stripe height (SH) flexures interconnecting said front side and said back wall of said box structure;
    wherein each said force pin, in response to actuation, applies a z-directional force to said corresponding head slider for lapping to a respective reader element target stripe height.

13. The lapping tool of claim 9, wherein each of said plurality of force pins is positioned to apply one or more forces targeting a single corresponding head slider of said row-bar.

14. The lapping tool of claim 9, wherein said plurality of force pins, in response to actuation, collectively twists said row-bar to concurrently set each said head slider of said row-bar for lapping to a target wedge angle.

* * * * *